United States Patent
Dirac et al.

(10) Patent No.: US 11,715,033 B2
(45) Date of Patent: *Aug. 1, 2023

(54) DYNAMICALLY SCALED TRAINING FLEETS FOR MACHINE LEARNING

(71) Applicant: Amazon Technologies, Inc., Seattle, WA (US)

(72) Inventors: Leo Parker Dirac, Seattle, WA (US); Rakesh Madhavan Nambiar, Seattle, WA (US); Avinash Aghoram Ravichandran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 648 days.

This patent is subject to a terminal disclaimer.

(21) Appl. No.: 16/742,768

(22) Filed: Jan. 14, 2020

(65) Prior Publication Data

US 2020/0151606 A1 May 14, 2020

Related U.S. Application Data

(63) Continuation of application No. 14/720,166, filed on May 22, 2015, now Pat. No. 10,540,608.

(51) Int. Cl.
| | |
|---|---|
| *G06N 5/04* | (2023.01) |
| *G06F 30/20* | (2020.01) |
| *G06N 3/08* | (2023.01) |
| *G06N 20/00* | (2019.01) |

(52) U.S. Cl.
CPC ............... *G06N 20/00* (2019.01); *G06N 5/04* (2013.01)

(58) Field of Classification Search
CPC .................................. G06N 20/00; G06N 5/04
See application file for complete search history.

(56) References Cited

U.S. PATENT DOCUMENTS

| | | | |
|---|---|---|---|
| 4,821,333 A | 4/1989 | Gillies | |
| 7,743,003 B1 | 6/2010 | Tong et al. | |
| 7,865,427 B2 * | 1/2011 | Wright | G06Q 40/03 705/38 |
| 8,078,556 B2 | 12/2011 | Adi et al. | |
| 8,429,103 B1 | 4/2013 | Aradhye et al. | |
| 8,606,730 B1 | 12/2013 | Tong et al. | |
| 8,612,368 B2 | 12/2013 | Burdick et al. | |
| 8,682,814 B2 | 3/2014 | DiCorpo et al. | |
| 8,744,981 B1 | 6/2014 | Servedio et al. | |
| 10,540,608 B1 * | 1/2020 | Dirac | G06N 20/00 |
| 2005/0105712 A1 | 5/2005 | Williams et al. | |
| 2006/0179016 A1 | 8/2006 | Forman et al. | |

(Continued)

OTHER PUBLICATIONS

Koch, et al., Tuning and evolution of support vector kernels, Evol. Intel., 2012, pp. 153-170 (Year: 2012).*

(Continued)

*Primary Examiner* — Brandon S Cole
(74) *Attorney, Agent, or Firm* — Robert C. Kowert; Kowert, Hood, Munyon, Rankin & Goetzel, P.C.

(57) ABSTRACT

A first set of execution platforms is deployed for a set of operations of a training phase of a machine learning model. Prior to the completion of the training phase, a triggering condition for deployment of a different set of execution platforms is detected. The different set of execution platforms is deployed for a subsequent set of training phase operations.

20 Claims, 11 Drawing Sheets

(56) References Cited

U.S. PATENT DOCUMENTS

| | | | |
|---|---|---|---|
| 2010/0268519 A1* | 10/2010 | Henning | G06Q 10/04 |
| | | | 703/6 |
| 2012/0154373 A1 | 6/2012 | Finocchio et al. | |
| 2012/0253927 A1 | 10/2012 | Qin et al. | |
| 2013/0290223 A1 | 10/2013 | Chapelle et al. | |
| 2014/0046879 A1 | 2/2014 | Maclennan et al. | |
| 2016/0148850 A1* | 5/2016 | David | H01L 22/20 |
| | | | 355/53 |
| 2017/0109646 A1* | 4/2017 | David | G06N 20/00 |
| 2019/0095785 A1* | 3/2019 | Sarkar | G06N 3/08 |

OTHER PUBLICATIONS

Dean, et al., Large Scale Distributed Deep Networks, NIPS'12 Proceedings of the 25th International Conference on Neural Information Processing Systems—vol. 1, 2012, pp. 1223-1231 (Year: 2012).*

U.S. Appl. No. 14/087,852, filed Nov. 22, 2013, Nikko Strom.
U.S. Appl. No. 14/569,458, filed Dec. 12, 2014, Leo Parker Dirac, et al.
U.S. Appl. No. 14/319,902, filed Jun. 30, 2014, Leo Parker Dirac.
U.S. Appl. No. 14/460,314, filed Aug. 14, 2014, Leo Parker Dirac.
U.S. Appl. No. 14/460,312, filed Aug. 14, 2014, Leo Parker Dirac.
U.S. Appl. No. 14/463,434, filed Aug. 19, 2014, Robert Mattihias Steele.
U.S. Appl. No. 14/489,448, filed Sep. 17, 2014, Leo Parker Dirac.
U.S. Appl. No. 14/489,449, filed Sep. 17, 2014, Leo Parker Dirac.
U.S. Appl. No. 14/538,723, filed Nov. 11, 2014, Polly Po Yee Lee, et al.
http://en.wikipedia.org/wiki/Broyden%E2%80%93Fletcher%E2%80%93Goldfarb%E2%80%93Shanno_algorithm, "Broyden-Fletcher-Goldfarb-Shanno Algorithm", Downloaded Apr. 1, 2015, pp. 1-5.
http://en.wikipedia.org/wiki/Limitedmemory_BFGS, "Limited-memory BFGS", Downloaded Apr. 1, 2015, pp. 1-5.
"API Reference", Google Prediction API, Jun. 12, 2013, 1 page.
"Google Prediction API", Google developers, Jun. 9, 2014, 1 page.
Dean, et al., Large Scale Distributed Deep Networks:, NIPS'12, Proceedings of the 25th International Conference on Neural Informational Processing Systems, vol. 1, 2012, pp. 1223-1231.
U.S. Appl. No. 14/720,166, filed May 22, 2015, Leo Parker Dirac.

* cited by examiner

DYNAMICALLY SCALED TRAINING FLEETS FOR MACHINE LEARNING

This application is a continuation of U.S. patent application Ser. No. 14/720,166, filed May 22, 2015, which is hereby incorporated by reference herein in its entirety.

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

At least for some types of problems, the process of developing a predictive machine learning model often includes a training phase, during which a set of collected observation records called a training data set is analyzed to identify relationships between some set of input variables and one or more output variables for which predictions are to be made using the model. The training data set may comprise millions or even billions of records, and may take up terabytes or even petabytes of storage in some cases, e.g., for "deep learning" problems. In some training techniques such as those involving the use of stochastic gradient descent (SGD) or similar optimization algorithms, the training phase may often involve several passes through the training data set, e.g., until the algorithm converges on an optimization goal such as an acceptably low value of a cost function or an error function.

Analyzing extremely large training data sets on a single machine may lead to unacceptably long training phase durations. For some training techniques, it may be possible to partition the training data set among several machines. Such parallelization approaches may require model parameter updates to be synchronized among the participating machines, however. Depending on how much data has to be transferred among the set of machines, in some scenarios the benefits of analyzing the training data in parallel may be offset by the introduction of bottlenecks in the network used for the synchronization-related data transfers. Determining the optimum number of machines to use in parallel for training various types of models for various sizes of training data sets may thus present non-trivial challenges even for experienced machine learning experts.

Figure 1:
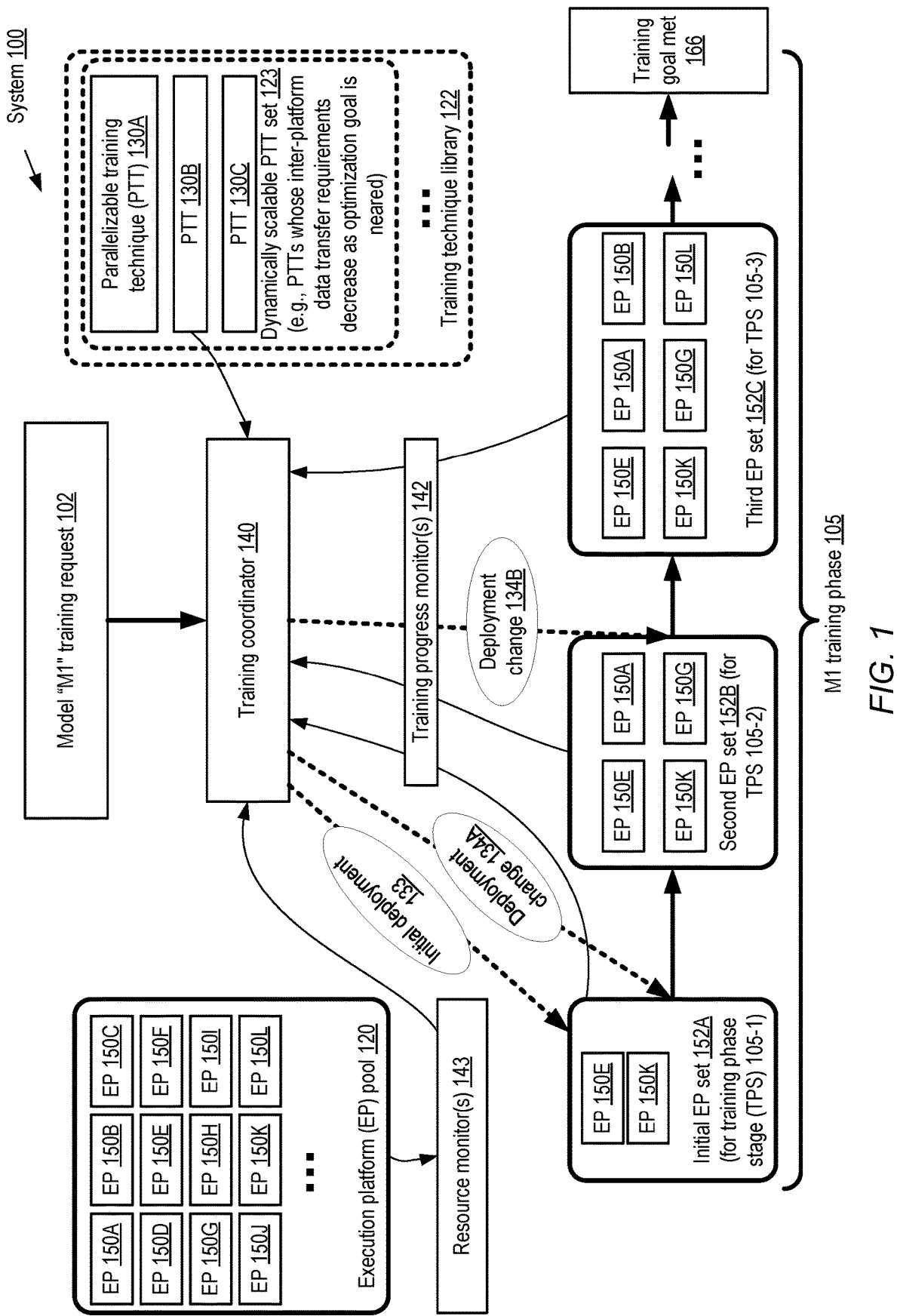
FIG. 1 illustrates an example system environment in which a set of execution platforms used for training a machine learning model may be dynamically scaled, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for dynamically scaling the set of execution platforms (e.g., physical or virtual machines) used for a training phase of a machine learning model are described. Numerous types of machine learning models are trained or generated by analyzing a set of collected observation records, which may be termed a training data set (or simply a training set). A given observation record may, for example, include values of one or more input variables, and corresponding values of one or more output or "prediction target" variables. The training process or "training phase" for a model typically involves determining statistical relationships (e.g., correlations) between the input and output variables, and deriving values of one or more model parameters (e.g., coefficients to be assigned to respective input variables) such that the model parameters can be used to predict the values of the output variables from the values of the input variables. In some iterative training techniques, as more and more observation records of the training data set are analyzed, the values of the model parameters are adjusted in view of an overall optimization goal (such as a goal of minimizing a prediction error metric or cost function). The training phase may be continued, sometimes re-analyzing the training data set multiple times, until a training termination condition is reached—e.g., either the optimization goal has been achieved to within a desired level of proximity, or the resources available for training the model have been exhausted.

In some training techniques, the observations of the training data set may be partitioned or distributed across multiple servers or execution platforms so that the parameter determination analysis can be parallelized. As each participating execution platform makes adjustments to the model parameters based on a different subset of observations, information about the adjustments made at the different platforms may have to be synchronized, e.g., via messages exchanged over a network among the participants, or via messages sent to a central parameter coordinator. The synchronization of the parameters may sometimes result in a network bottleneck, which could offset the hoped-for benefits of the parallelization. For example, during the early stages of a training phase of a model, substantial changes to the model parameters may result from the analysis of small groups of observation records, or even individual observation records, and as a result the amount of synchronization-related data that has to be transmitted over the network may be quite large. In contrast, later in the training phase, many of the parameter values may have largely converged to their optimal values, so relatively small amounts of synchronization data may have to be transmitted over the network. Thus, at least for some training algorithms, the relative amounts of network bandwidth resources required, versus the computation resources required at the execution platforms, may change over the course of a given training phase of a given model. Instead of using the same number of execution platforms throughout the training phase, in at least some scenarios it may be useful to change the number of execution platforms (and/or the types of execution platforms) deployed at various stages of the training phase. Using such a dynamic scaling technique, the total amount of time (and/or the total resource usage) for training the model may be reduced or minimized in various embodiments.

According to at least some embodiments, an indication of a request to train a machine learning model using a specified training data set may be received at one or more computing devices responsible for coordinating model training and/or for making parallelism-related resource deployment decisions. Such computing devices may be referred to herein as training coordinators or parallelism decision nodes. In one embodiment the request may initially be transmitted to a component of a distributed multi-tenant machine learning service by a client of the service, for example. A pool of execution platforms which can be used for training various models (as well as for other machine learning tasks as discussed below) may be available to the training coordinators in various embodiments. Based on one or more factors such as the type of model which is to be generated, the problem domain of the model, the size of the training data set, and/or on a parameter specified in the request, a parallelizable training technique to be used for the model may be identified. The term "parallelizable technique", as used herein, refers generally to techniques which may be run either on a single execution platform, or on multiple execution platforms concurrently. In some embodiments, the training technique selected may not be designed to run in a single-threaded mode: that is, the technique may require multiple execution platforms. The term "parallelizable technique", as used herein, is also intended to cover such techniques which cannot be implemented in a non-parallel mode.

In some embodiments, the parallelizable training technique may comprise the use of an optimization algorithm (such as stochastic gradient descent or similar algorithms) which has the property that as the optimization goal of the algorithm is neared, the amount of data that has to be transferred among the participating execution platforms typically falls. For an initial stage or sub-phase of the training phase of the model, a training coordinator may assign a first subset of the execution platforms available. In various embodiments, the training coordinator may also identify one or more conditions which are to trigger, prior to the completion of the training phase, a deployment of a different subset of the plurality of execution platforms. For example, if the cumulative amount of synchronization data that is transferred from the execution platforms falls below a threshold, a larger set of execution platforms may be suitable. Various other examples of the kinds of conditions which may lead to a change in the deployed execution platforms are discussed below in further detail.

The first subset of the execution platforms may then be activated to initiate the training phase in various embodiments. If the first subset includes multiple platforms, the training data set may be partitioned among the members of the first subset in at least some embodiments. The training coordinator may collect various metrics as the first stage or first set of operations of the training phase progresses—e.g., metrics regarding the amount of parameter synchronization data being transferred, the fraction of the training data set that is yet to be examined during the current iteration or pass through the training data set, the extent of convergence that has been achieved towards the optimization goal being pursued, resource utilization levels at the execution platform pool members and/or the interconnect(s) being used for the synchronization data, and so on. In some embodiments the training coordinator may detect, e.g., using some of the metrics collected, that one or more of the triggering conditions for a deployment change has been met. In such a scenario, a second subset of the plurality of execution platforms may be identified, to be used for at least a second stage or a second set of operations of the training phase. The second subset may include, for example, a different number of execution platforms, or at least some platforms which differ in performance or functional capabilities from one or more platforms of the first subset. In some embodiments, at least a portion of the training data set may be repartitioned, e.g., so that respective portions of the training data are assigned to each of the execution platforms of the second subset.

The second subset of the execution platforms may then be activated (and, depending on the overlap between the first subset and the second subset, one or more execution platforms of the first subset may be de-activated or released for other uses). The training coordinator may resume monitoring metrics pertaining to the progress of the training phase. As needed, if the triggering conditions for deployment changes are met, additional changes to the set of execution platforms deployed for the training phase may be made over time. Eventually, the goals of the training phase may be reached, and the training phase may be terminated. The training of the model may be ended based on any of various factors in different embodiments: e.g., if the cost function being optimized has met the optimization goal, if the entire training data set has been analyzed as many times as intended, if the maximum time set aside for training has elapsed, if the cumulative resource consumption of the training process has reached a threshold, or if a client's budget for training the model has been exhausted. After the training phase is complete, in some embodiments a test phase and/or an evaluation phase may be implemented in which the quality of the model's predictions on new data (e.g., observations that were not included in the training data set) that is determined. If the model's quality is deemed adequate, the model may then be employed for predictions in a production mode in some embodiments.

As described above, the number and/or types of execution platforms being used to train a given model may be changed based on one or more triggering conditions in various embodiments. As a result, in at least some embodiments, the training phase as a whole may be completed sooner, and/or at a lower total cost, than if a fixed set of execution platforms were used for the whole of the training. The techniques described herein may be applied for machine learning problems in a number of different domains, including, for example, deep learning problems, language translation or other natural language processing problems, financial fraud detection, terrorism threat level detection, health diagnosis, and the like, many of which may require the analysis of extremely large training data sets. While dynamic scaling approaches of the kinds discussed herein may be especially well suited to parallelizable training techniques such as stochastic gradient descent in which the amount of data that is exchanged among the participating training nodes or servers typically changes (e.g., diminishes) during the course of training a given model, similar approaches may be taken with respect to other parallelizable training algorithms in various embodiments.

Example System Environment

FIG. 1 illustrates an example system environment in which a set of execution platforms used for training a machine learning model may be dynamically scaled, according to at least some embodiments. As shown, system 100 includes a training coordinator 140 and a pool 120 of execution platforms (EPs) which can be deployed singly or in combination for training various machine learning models. In some embodiments at least some of the execution platforms may also be utilized for other machine learning-related operations such as testing/evaluating models, executing models, data cleansing, feature processing, and the like. In one embodiment, pool 120 may be dedicated exclusively to model training. As shown, pool 120 includes EPs 150A-150L in the depicted embodiment. Several types of execution platforms may be available in one or more pools 120 in different embodiments: for example, in some environments, at least some of the platforms may be implemented as virtual machines, while in other environments, un-virtualized servers may be used as execution platforms. In some embodiments, all the execution platforms of a pool 120 may have similar or identical performance capabilities and/or functional characteristics, while in other embodiments a diverse collection of execution platforms (e.g., with some platforms differing from others in computational, memory, networking, storage or functional capabilities, or differing from others in processor architecture or memory architecture) may be available for training models. Any of numerous types of interconnects may be used for network communication among the EPs 150 in various embodiments, including for example various versions of Ethernet, Token Ring, or custom interconnects. In some embodiments, the EPs may be configurable as fully-connected clusters in which a given network packet of a given EP has to traverse a single hop to reach any other EP, while in other embodiments some EP-to-EP packet transfers may involve different numbers of hops than other transfers.

Figure 8A:
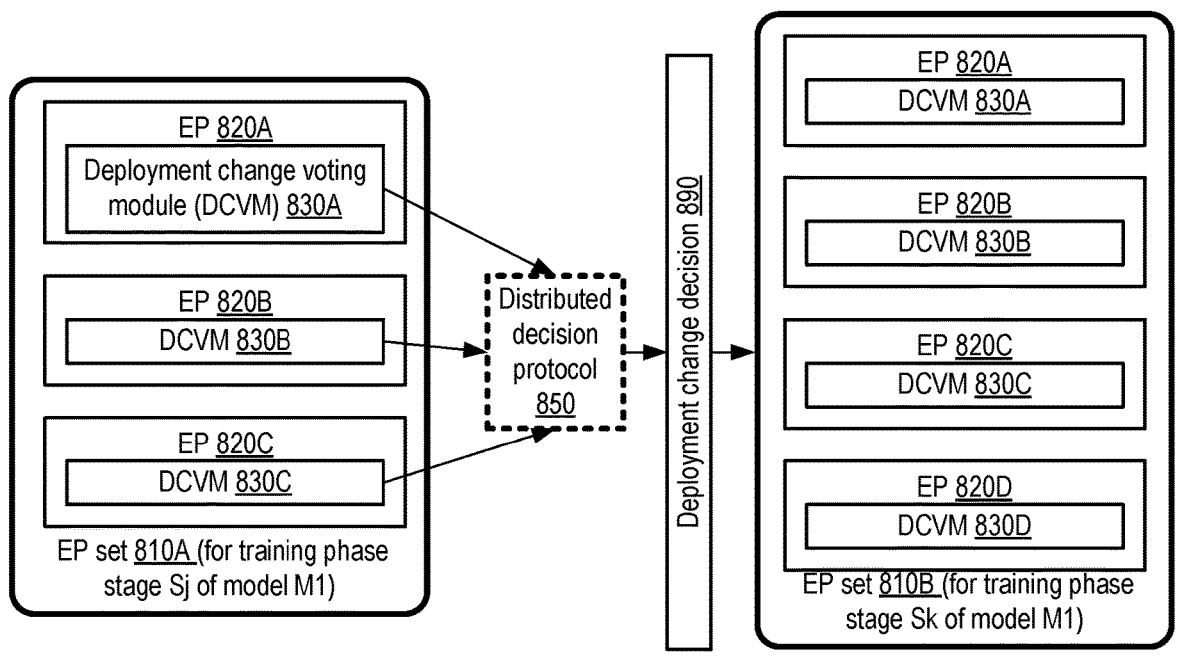
FIG. 8a and FIG. 8b illustrate respective examples of the participation of one or more execution platforms in deployment change decisions, according to at least some embodiments.
Figure 8B:
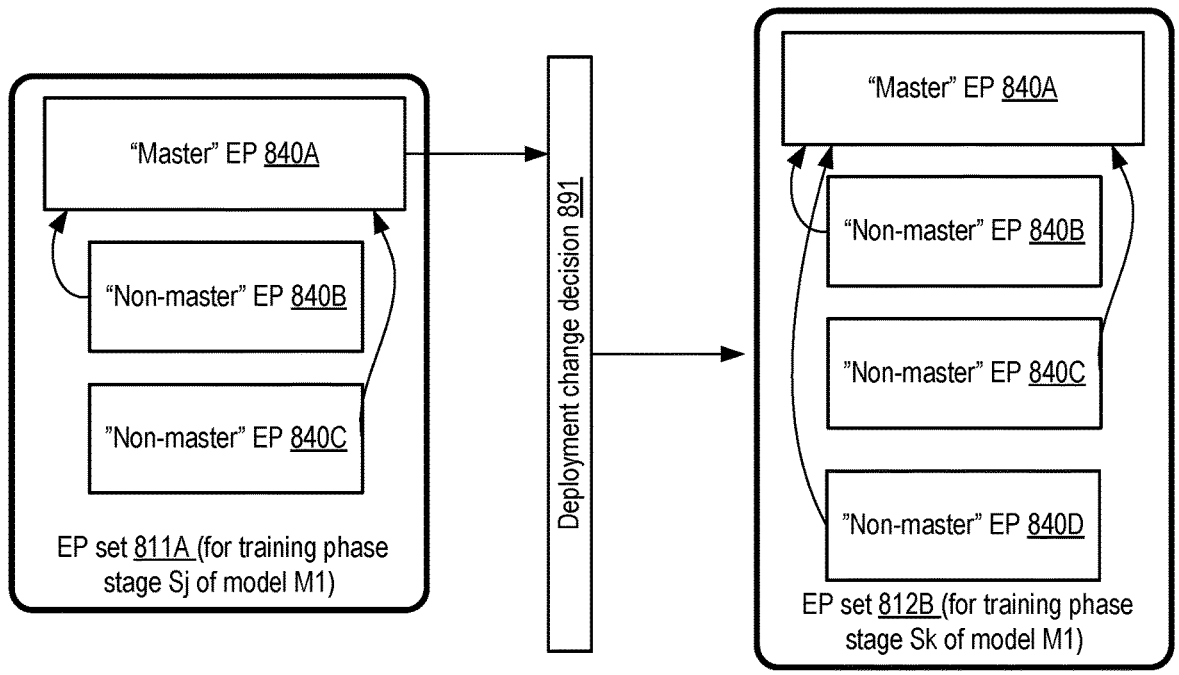

The training coordinator 140, which may be implemented at one or more computing devices in the depicted embodiment, may be responsible for determining the set of EPs 150 that are to be deployed during various stages of the training phase of a given model. The role of training coordinator may be fulfilled by a variety of different entities of system 100 in different embodiments. In some cases, for example, one or more dedicated components of a workload distribution strategy layer of a machine learning service may be designated as a training coordinator for at least one model, as described below in the context of FIG. 9. In other embodiments, as illustrated in FIG. 8a and FIG. 8b and also discussed below, one or more of the EPs 150 may participate in deployment change decisions, and such EPs may collectively or individually be considered training coordinators, or at least participants in decision making with respect to training-related deployment changes. The responsibilities of a training coordinator may not necessarily be assigned to any single entity in various embodiments—e.g., different entities may coordinate the training of different models, and/or a plurality of entities may coordinate the training of a given model.

In the embodiment shown in FIG. 1, the training coordinator 140 may receive an indication of a request 102 to train a machine learning model "M1" using a particular training data set (the data set is not shown in FIG. 1). Dynamically parallelized training of instances of a number of different categories of machine learning models associated with numerous problem domains may be managed by the coordinator 140. For example, various types of regression models (including models employing linear regression, logistic regression, multiple regression, stepwise regression and/or other regression analysis techniques), binary classification models, multi-class classification models, natural language processing models, Gaussian process models, decision tree models, ensemble models, time series models, and/or other categories of models may all be trainable using parallel training techniques. A library 122 of several alternative training techniques may be available to training coordinator 140 in the embodiment shown in FIG. 1. Library 122 may include a set 123 of dynamically scalable parallelizable training techniques (PTTs), such as PTTs 130A, 130B and 130C. PTTs 130 may include a variety of optimization techniques in some embodiments, such as, for example, stochastic gradient descent (SGD), the Broyden-Fletcher-Goldfarb-Shanno (BFGS) algorithm, limited memory BFGS (also known as LMBFGS), and the like. At least some of the PTTs which involve optimization may have the property that as an optimization goal (e.g., a global or local minimum of a cost function) is approached, the inter-EP data transfer requirements generally tend to decrease. In such cases, as the parallel training technique 130 involving some number of EPs converges towards a solution (e.g., a set of model parameter values which provide predictions of a sufficiently high quality or accuracy), the amount of data that has to be transferred from (and/or to) the participant EPs for further optimization of the solution generally tends to fall. In other embodiments, the data transfer characteristics of some or all of the PTTs available to the training coordinator 140 may differ from those described above—e.g., a relatively constant amount of data may be transferred among the participant EPs regardless of the proximity to a solution.

A model training request 102 may indicate the particular PTT 130 to be employed in some embodiments. In other embodiments, the training coordinator 140 may select a particular PTT 130 (such as 130B) for training a given model such as M1, e.g., based on factors such as the type of model being trained, the size of the training data set, constraints on the resources or time which can be used for training M1, and so on. The training coordinator 140 may identify and deploy an initial EP set 152A, comprising for example EPs 150E and 150K, for a first stage 105-1 of M1's training phase 105, as indicated by initial deployment arrow 133. In addition, depending on various factors such as the particular PTT selected, the training coordinator 140 may also determine one or more triggering conditions which are to lead to a change to the EP set used for M1 as the training phase progresses. In some embodiments, a reduction in the bandwidth required for transmitting parameter updates (or synchronizing the parameters) among the EPs may trigger a deployment change (DC), for example, and the training coordinator may decide the extent of the reduction that is to trigger the DC as well as the particular changes which would be implemented if the reduction condition is met. In other embodiments, when the fraction of the training data that has been examined reaches a threshold (e.g., a complete pass of several planned passes through the training data, or 50% of the training data), a deployment change may be triggered. A variety of factors may trigger deployment changes in different embodiments, as discussed below in further detail.

The training coordinator 140 may collect data from a variety of sources to help make deployment change decisions in the depicted embodiment. For example, a set of resource monitors 143 may provide usage metrics regarding various resources (e.g., CPUs/cores, network bandwidth, memory, storage devices and the like) from various members of the EP pool 120 to coordinator 140, and training progress monitor(s) 142 may indicate the rate at which the PTT is converging, or the fraction of the training data that has been analyzed in the current pass. The EPs 150E and 150K of the deployed EP set 152A may themselves provide progress indications to the coordinator 140 in some embodiments, in which case separate progress monitors 142 may not be required. Based on the collected data and/or on other factors (e.g., based on the time that has elapsed since the initial deployment 133, or the accumulated billing charges associated with stage 105-1), the training coordinator may determine that deployment change 134A is to be implemented. An additional pair of EPs, EP 150A and EP 150G, may be added to EP set 152A to form a second EP set 152B for the next stage 105-2 of the training phase 105. The boundaries between stages 105-1 and 105-2 (and between stages 105-2 and 105-3) may be defined by the deployment change decisions made at the coordinator 140 in various embodiments—that is, there may not be any intrinsic difference in the types of operations performed in the different stages, other than the set of EPs implementing the operations. Generally speaking, each stage of the training phase may comprise a respective set of operations or computations. The training coordinator may continue collecting metrics from sources such as resource monitors 143 and training progress monitors 142.

In the example scenario depicted in FIG. 1, a second deployment change 134B, involving the addition of two more EPs (150B and 150L) may be implemented when the corresponding triggering conditions are met, resulting in EP set 152C. In some embodiments, the types of conditions which trigger the next deployment change (e.g., 134B) may differ from those that led to the previous deployment change (e.g., 134A). The training coordinator 140 need not necessarily identify triggering conditions for more than one deployment change at a time in some embodiments. In other embodiments, a list of triggering conditions may be determined beforehand, corresponding to each of a plurality of deployment changes. Additional deployment changes (some of which may involve a reduction in the number of EPs deployed) may be implemented, until eventually one or more training phase goals are met as indicated in box 166, and the training phase is completed. It is noted that in some cases, the training goals may not necessarily require a specific pre-determined optimization goal of the PTT to be reached—e.g., the training phase may be deemed complete if a certain number of passes through the training data set have been completed, or a targeted time for training has elapsed. After the training phase has ended, in some embodiments one or more test phases and/or evaluation phases may be conducted before the trained model is used for production-level predictions.

Overview of Data Parallelism Approaches

Figure 2:
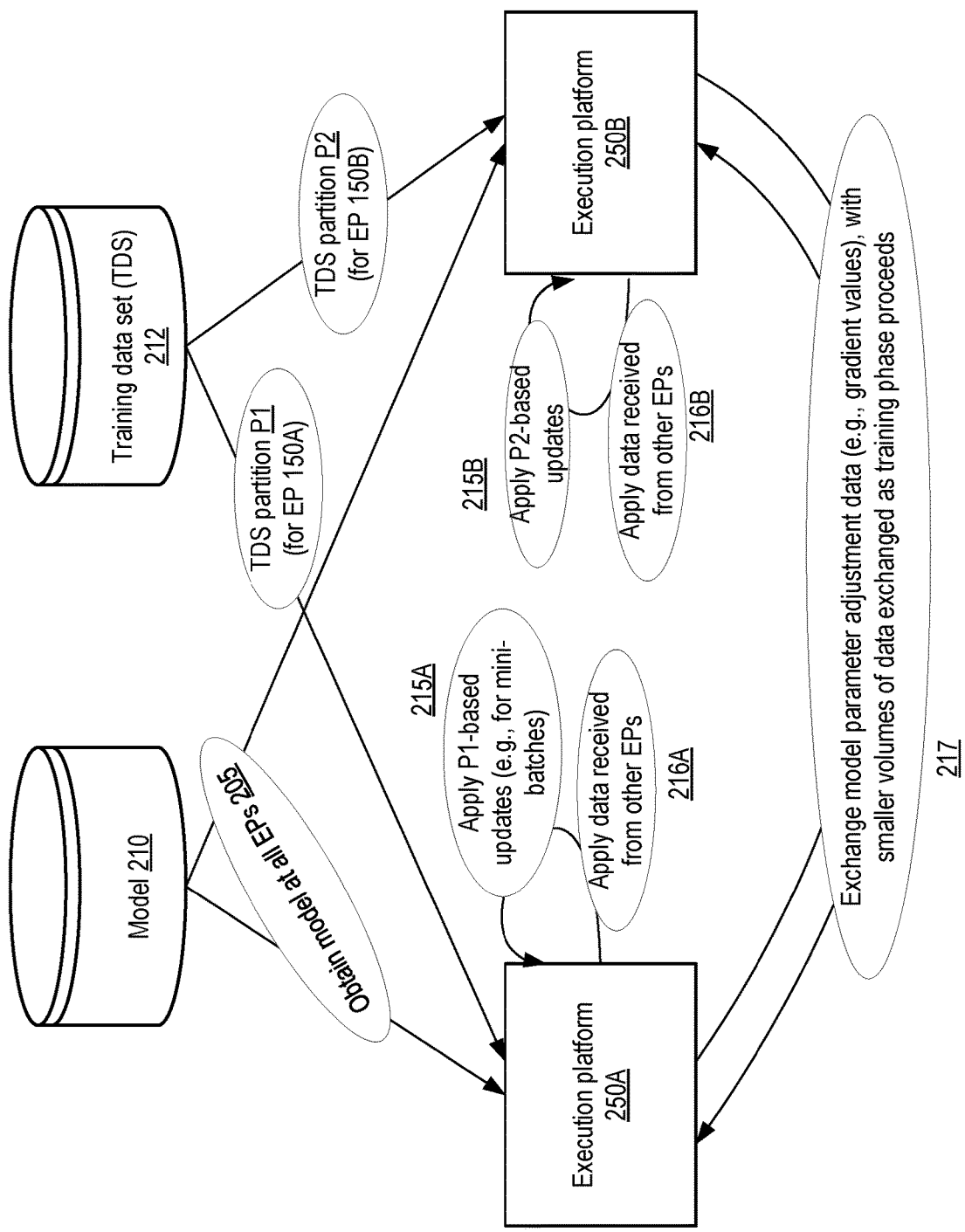
FIG. 2 illustrates an overview of a data parallelism-based approach for training a model, according to at least some embodiments.

FIG. 2 illustrates an overview of a data parallelism-based approach for training a model, according to at least some embodiments. To simplify the presentation, a trivial example scenario involving the use of a pair of execution platforms 250A and 250B is shown. In general, any number of model execution platforms may be used to train a model. The execution platforms 250A and 250B may each obtain a copy of the model 210 to be trained from model storage device(s), as indicated by arrows 205. Each of the EPs 250A and 250B may also obtain a different subset or partition of training data set (TDS) 212—e.g., partition P1 may be assigned to EP 250A, and partition P2 may be assigned to EP 250B. For example, TDS 212 may be partitioned into equal parts for each EP in some embodiments. In other embodiments, the amount of training data provided to any particular EP may not be equal to the amount of training data provided to some other EP. The training data may include observation records which mimic or approximate input data upon which the model will be expected to operate during normal usage. In addition, the training data may include output data that corresponds to the known correct or otherwise expected output for a given input. To train a model, the observations of the training data may be processed together with the model, and model parameters may be adjusted until the model output converges on the correct output with a desired level of accuracy.

In one specific non-limiting example, the model to be trained may be a neural network for automatic speech recognition ("ASR"), such as an acoustic model. The neural network may be configured to accept input vectors that include some number of feature vectors computed from audio data of user utterances. The neural network may operate on the input vectors, applying weights at any number of internal layers of the neural network, eventually producing an output vector. The output vector may include a likelihood, for each phoneme or other subword unit of a given language, that the input vector corresponds to the particular phoneme or other subword unit. Training data for such a neural network may include feature vectors computed from audio of user utterances, known correct transcriptions of the user utterances, or known correct phonemes for each feature vector, etc.

As shown in FIG. 2, each execution platform 250 used for training may process a different partition of the training data. In the neural network example above, a given EP such as 250A may use the neural network to process a particular input vector from its portion of the training data, and generate a corresponding output vector. The EP 250A may determine the difference between the output vector and the correct output (e.g., determine the "error" for a particular subset of input data). The EP 250A may then determine how the parameters of the model should be updated or modified in order to reduce the error. For some types of training algorithms such as stochastic gradient descent, the collection of updates to the parameters of a model may be referred to as a "gradient" because each update may be based on the direction in which the corresponding parameter should be modified (e.g., whether a value of the parameter is to be increased or decreased by a particular amount). In some implementations, the gradient may include a collection of updates to all parameters of a model (e.g., a collection of values by which the parameters are to be adjusted) based on the entire corpus of training data. In stochastic gradient descent, a gradient may be computed for subsets of the TDS partitions P1 and P2, which may be referred to as "mini-batches." Because such gradients are based on less than the entire TDS, they may be referred to as "partial gradients." A partial gradient may nevertheless include an update value for each individual parameter of the model in at least some implementations.

In a baseline version of a training technique, each EP 250 may apply all the updates it has computed based on the analysis of its partition of the TDS (as indicated by elements 215A and 215B). Because each EP determines its parameter updates based on output from different training data input, the models at the different EPs may diverge. In order to ensure that each copy of the model being trained is using the same parameters, the EPs may exchange model synchronization data. As indicated by arrows 217, each EP may transmit respective sets of parameter adjustment data (e.g., the complete partial gradient, or some condensed version thereof) to other EPs. The received parameter adjustments may then be applied (as indicated by elements 216A and 216B) in addition to the local parameter updates at each EP. For example, such data transfers may be performed as soon as a given mini-batch is processed in some embodiments. Over time, as more and more of TDS 212 is analyzed, the number of changes that have to be applied to the model's parameters may decrease, and the volume of data that has to be transferred may therefore decrease as well. Eventually, the model parameters may converge to values which do not require further changes (i.e., additional changes may not make any appreciable difference to the prediction errors), at which point the training may be considered complete. (Of course, as indicated earlier, in some cases such convergence may not be a prerequisite for ending the training phase—instead, the training phase may be terminated when the entire TDS 212 has been examined a predetermined number of times, or if resources or time allocated for training the model have been exhausted.)

In a refinement of the baseline training technique, in some embodiments, an EP 250 may determine which individual update values will make a substantial difference in the model. This subset of update values may be referred to as the "salient gradient." In some embodiments, only those update values that meet or exceed some predetermined or dynamically determined threshold may be included in the salient gradient. In such embodiments, each EP 250 may apply its own salient gradient to its own local copy of the model in order to modify the parameters of the model. The model synchronization data may include the salient gradient that each respective EP applied to its own copy of the model. Using the salient gradient instead of the complete partial gradient may help to reduce the volume of data transfers among the EPs in at least some embodiments, with little or no impact to the overall quality of the trained model's predictions. It is noted that with respect to gradient-based training algorithms, the dynamic scaling techniques described herein may be applied independently of the particular variants or refinements of the algorithm.

Deployment Changes Triggered by Reduction in Bandwidth Requirements

Figure 3:
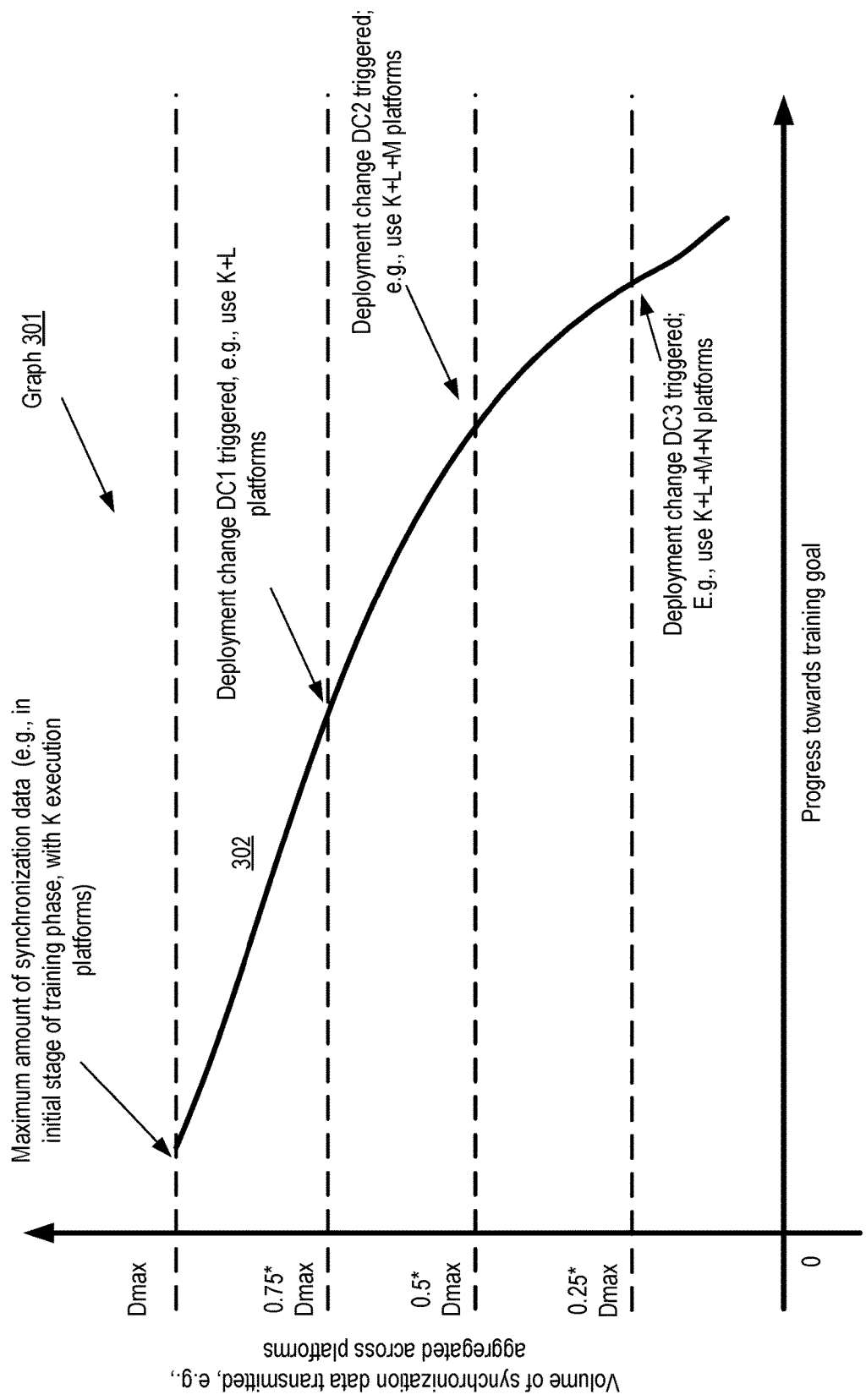
FIG. 3 illustrates an example of a dynamic scaling technique in which deployment changes during a training phase of a model may be triggered by decreases in the amount of data that is to be transferred among the execution platforms deployed, according to at least some embodiments.

Any desired number of EPs may be used to implement training techniques of the kind discussed in the context of FIG. 2 in various embodiments. Of course, in the early stages of the training, substantial data transfers may be required in some gradient-based approaches, so assigning a large number of EPs early on may result in high bandwidth consumption. In contrast, when the model is closer to convergence, the network may be unlikely to be a bottleneck, and it may therefore be more effective to deploy additional EPs to the training phase. FIG. 3 illustrates an example of a dynamic scaling technique in which deployment changes during a training phase of a model may be triggered by decreases in the amount of data that is to be transferred among the execution platforms deployed, according to at least some embodiments. Progress or convergence towards a training goal (such as minimization of an error function or a cost function) increases from left to right on the X-axis of the graph 301, and the amount or volume of synchronization data transferred from or to the set of execution platforms used for the training increases from the bottom to the top on the Y-axis. In general, at least for some training techniques, progress towards the training goal may not necessarily be linearly related to elapsed time—e.g., the rate of convergence may accelerate over time (especially if more execution platforms are deployed over time as in the depicted scenario). It is noted that graph 301 is intended to illustrate general trends in the relationship between the training progress and the data transfer volume, and is not meant to indicate exact measurements.

In the depicted example scenario, K execution platforms are deployed to begin the training phase of a particular model using a parallelizable training technique, and the maximum volume of data transfer (Dmax) occurs near the beginning of the training. Curve 302 represents changes in the amount of data to be transferred as the training phase proceeds. A training coordinator may monitor the amount of data transferred (e.g., by collecting data transfer or bandwidth usage metrics from each of the EPs, or by sampling metrics from some subset of the EPs). As the data transfer volume decreases relative to Dmax, three deployment changes may be initiated by the training coordinator in the depicted example. When curve 302 crosses the (0.75*Dmax level), L additional EPs may be deployed in a first deployment change DC1. Similarly, when curve 302 crosses the (0.5*Dmax) level, deployment change DC2 may involve the addition of M EPs, and when curve 302 crosses (0.25*Dmax), an additional N EPs may be deployed as part of deployment change DC3. DC1, DC2 and DC3 may be categorized as bandwidth demand-based or bandwidth demand-triggered deployment changes. The specific triggering conditions or thresholds for bandwidth-demand based deployment changes may vary in different implementations. For example, instead of using relative values with respect to a maximum data transfer volume (such as 0.75*Dmax for DC1, 0.5*Dmax for DC2 etc.), absolute reductions in demands may be used to trigger deployment changes in some embodiments. Any desired levels of bandwidth demand reduction may be used for triggering deployment changes in various embodiments. In one embodiment, if the data transfer volume increases beyond a threshold during some stage of the training phase, the number of EPs deployed may be reduced. In other embodiments, if the data transfer volume increases, the number of EPs deployed may be kept constant at least for some period, e.g., in the expectation that the rate of increase is unlikely to be sustained.

Deployment Changes at Epoch Boundaries

Figure 4:
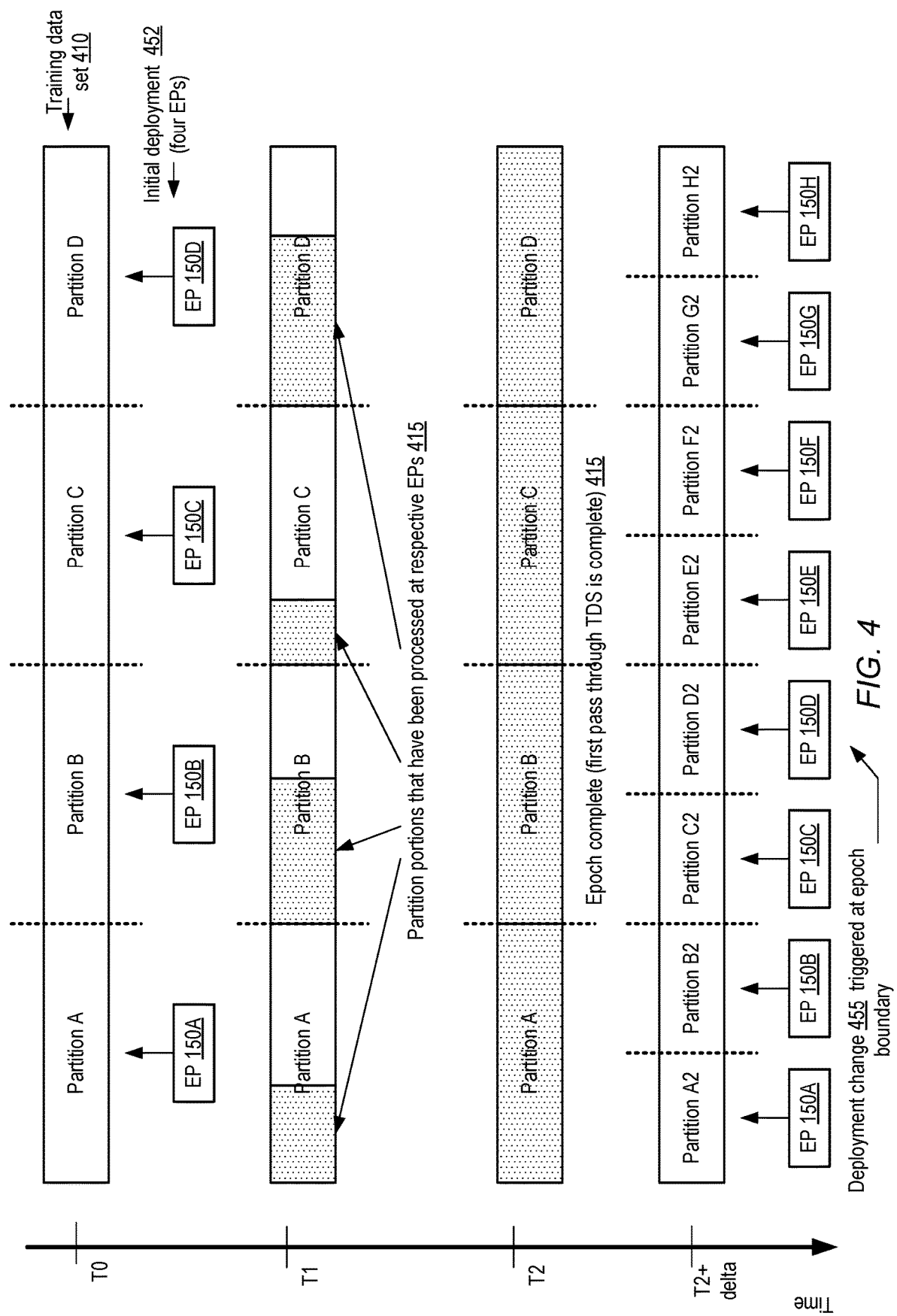
FIG. 4 illustrates an example of a dynamic scaling technique in which deployment changes may be implemented at epoch boundaries of a training phase, according to at least some embodiments.

In some embodiments, factors other than (or in addition to) bandwidth demand changes may be taken into account when making deployment changes with respect to parallelism. In at least some training techniques, the training data set may be examined several times before the training is considered complete. For example, a single pass through the entire training data set may often be insufficient to reach the optimization goals of the training technique, so one or more additional passes through the data set may be scheduled. Each complete pass through the training data set may be termed an "epoch" herein. FIG. 4 illustrates an example of a dynamic scaling technique in which deployment changes may be implemented at epoch boundaries of a training phase, according to at least some embodiments.

In the example scenario illustrated in FIG. 4, a training data set 410 is initially split into four equal (or approximately equal) subsets for respective execution platforms, e.g., at a time T0 corresponding to the beginning of a model's training phase. Partitions A, B, C and D are assigned to EPs 150A, 150B, 150C and 150D respectively in initial deployment 452. Elapsed time increases from the top towards the bottom of FIG. 4. The progress made by the EPs through their respective partitions at a later time T1 is indicated by the shaded portions 415 of the partitions. As shown, different EPs may process their partitions at different rates—that is, the particular parallelizable training technique being used may not require all the EPs to analyze their subset of observation records at the same pace. In other training techniques, the progress of the different EPs may be more closely synchronized.

Eventually, at approximately time T2, each of the four EPs 150A-150D may complete their pass through their respective partition, thereby completing a first epoch, and the completion of the epoch may trigger deployment change 455 in the depicted embodiment. The number of EPs deployed for the next epoch may be doubled from four to eight in deployment change 455. Thus, at time (T2+delta), eight EPs 150A-150H may be deployed in total, and the data set may be partitioned into eight smaller partitions A2-H2 for the respective EPs for the second epoch. Such a deployment change may be made under the assumption that the amount of model parameter synchronization data that will need to be transferred during the second epoch or pass through the training data is likely to be less than the amount that was transferred during the first epoch, for example. In some embodiments in which deployment changes are made at epoch boundaries, the training coordinator may attempt to verify that there is in fact a downward trend in the data transfer volume as the first epoch nears its end, before making a deployment change of the kind shown in FIG. 4. Additional deployment changes may be made at the completion of subsequent epochs (e.g., 16 EPs may be deployed for the third epoch, and so on) in some implementations. The number of EPs deployed need not necessarily be doubled at each epoch boundary; instead, any desired change (or no change at all for some particular epoch boundaries) to the number of EPs deployed may be made in various embodiments.

Intra-Epoch Deployment Changes

Figure 5:
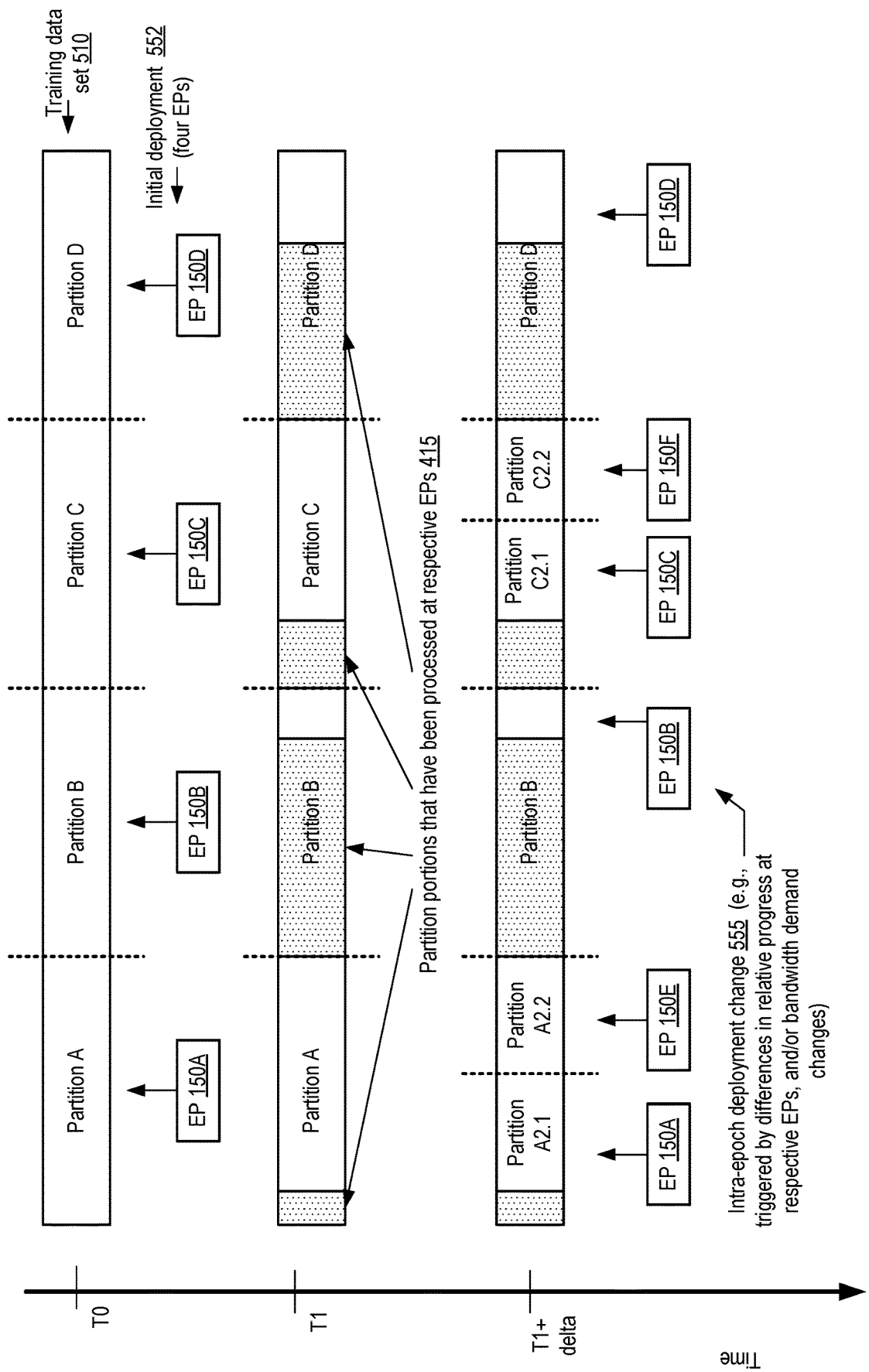
FIG. 5 illustrates an example of a dynamic scaling technique in which deployment changes may be implemented within one or more epochs of a training phase, according to at least some embodiments.

Instead of waiting until an epoch is completed to make a deployment change, in some embodiments a training coordinator may alter the EP set of a training phase during the course of an epoch under certain conditions. FIG. 5 illustrates an example of a dynamic scaling technique in which deployment changes may be implemented within one or more epochs of a training phase, according to at least some embodiments. As in the example scenario shown in FIG. 4, a training data set 510 is divided at time T0 into four partitions for an initial deployment 552 of four EPs, 150A-150D. The four EPs proceed to update the model using the respective observation records of partitions A, B, C and D at different rates.

The training coordinator may monitor the progress of the different EPs in the depicted embodiment (represented by shaded portions 515), and detect at approximately time T1 that EPs 150A and 150C have made much less progress through their partitions than EPs 150B and 150D. If the difference between the relative amounts of progress made by different EPs exceeds a threshold, this may trigger a deployment change 555 in the depicted embodiment. For example, an addition EP 150E may be assigned to share the processing of the as-yet-unexamined portion of original partition A with EP 150A, and an additional EP 150F may be assigned to share the processing of the as-yet-unexamined original partition C with EP 150C. The unexamined portion of partition A may thus in effect be divided into two new partitions A2.1 and A2.2 assigned to EPs 150A and 150E respectively, and similarly the unexamined portion of partition C may be divided into two new partitions C2.1 and C2.2 assigned to EPs 150C and 150F respectively. In at least some embodiments, the training coordinator may not necessarily implement a deployment change such as DC 555 on the basis of the lagging progress of one or more EPs—instead, additional factors such as a reduction in bandwidth demand may also be taken into account. Thus, in some embodiments, new EPs may not be assigned in the middle of a given epoch unless at least some threshold reduction in data transfer bandwidth demand has occurred, even if the current set of EPs differ greatly from one another in their relative progress through their partitions.

Resource Utilization Based Deployment Changes

Figure 6:
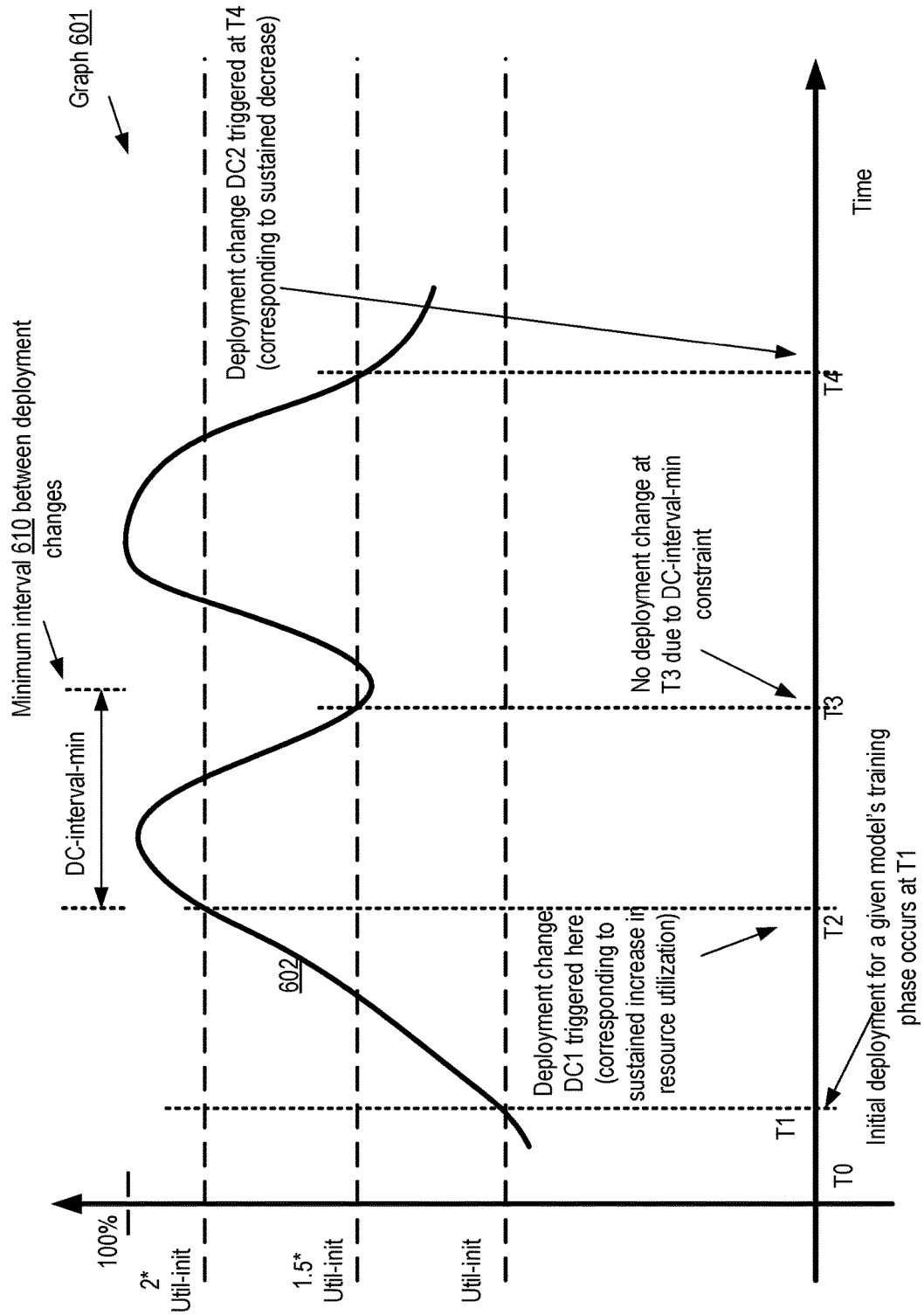
FIG. 6 illustrates an example of a dynamic scaling technique in which deployment changes may be implemented during a training phase based on resource utilization levels of an execution platform pool, according to at least some embodiments.

In some embodiments, aggregated or average resource utilization levels within the EP pool may be taken into account when making at least some types of deployment changes. Considerations of resource utilization (or possible exhaustion of resource capacity) may be especially important when a model is being trained using multi-tenant or shared resources, as may occur at a machine learning service such as that illustrated in FIG. 9 and discussed below. FIG. 6 illustrates an example of a dynamic scaling technique in which deployment changes may be implemented during a training phase based on resource utilization levels of an execution platform pool, according to at least some embodiments.

Graph 601 indicates the utilization level of a particular resource within an EP pool, with elapsed time increasing from left to right. Running averages of the utilization level (e.g., averaged over some recent interval of X minutes or seconds) may be used for deployment decisions in the depicted embodiment, instead of using instantaneous utilization values which may fluctuate more rapidly. The utilization of any of a number of different resources may impact deployment changes in the depicted embodiment. For example, one such resource may be the average fraction of consumed network bandwidth capacity between a given EP and the rest of the EP pool. The ratio of EPs that are currently assigned to other machine learning tasks, to the total size of the EP pool, may constitute another resource utilization level which could impact deployment changes. In general, the utilization level of any such resource associated with the EP pool may change over time, as indicated by curve 602.

In the example scenario depicted in FIG. 6, an initial deployment of EPs for a model's training phase occurs at time T1. The training coordinator tracks the utilization level of a particular resource, which corresponds to curve 602, over time. At the time of the initial deployment, the resource utilization level is Util-init, which is assumed to be less than half of the maximum possible utilization level of 100% for the purposes of the example discussed herein. If the utilization curve 602 of the resource shows a sustained positive slope (that is, if the utilization keeps increasing), and crosses a threshold such as 2*Util-init, a deployment change DC1 may be triggered in the depicted embodiment. For example, if the fraction of the EP pool that is assigned to some task was 40% at time T1 and increases to 80% at time T2, and the particular training phase being considered had numerous EPs deployed at the start of the training phase, one or more EPs may be freed or released for other uses in deployment change DC1. Similarly, if the used fraction of the EP-to-EP bandwidth increases to double its initial value, in some training techniques it may be advisable to reduce the number of EPs deployed.

A minimum interval 610 between successive resource availability-based deployment decisions may be enforced in some embodiments. Thus, even though a training coordinator may be configured to make a deployment change when the resource utilization decreases from 2*Util-init to 1.5*Util-init in the depicted embodiment, and such a change occurs at time T3, the minimum interval constraint may prevent a deployment change at T3. At T4, however, when a second such change occurs, a corresponding deployment change DC2 may be implemented in the depicted embodiment, as the interval elapsed since the previous deployment change is longer than minimum interval 610. For example, in some embodiments additional EPs may be assigned to the training phase at T4 if more EPs have once again become available relative to T2, or if more bandwidth has become available relative to T2.

It is noted that in various embodiments, a training coordinator may make deployment change decisions based on any desired combination of factors of the kinds discussed with respect to FIG. 3-FIG. 6, and may not necessarily be restricted to considerations of a fixed number of factors. Furthermore, in at least some embodiments, other factors than those illustrated herein may be taken into account (e.g., in addition to or instead of the factors discussed with respect to FIG. 3-FIG. 6). For example, in some embodiments clients may indicate relative priorities for different model training tasks, or may indicate respective budgets for training different models, and the priorities and/or budgets may influence the deployment decisions made during the course of a given training phase. In at least one embodiment, more than one training technique may be employed for training a particular model—e.g., the training may be begun using stochastic gradient descent, but at some stage the training coordinator may switch to a different algorithm such as the Broyden-Fletcher-Goldfarb-Shanno (BFGS) algorithm. Such algorithm changes may be useful in some scenarios because different algorithms may be better suited for different stages of optimization—e.g., one algorithm may be more effective when substantial changes to the model parameters are made per batch of observation records, while another algorithm may perform better after the model parameter values have largely converged. Changes to the training techniques being used for a given model may also trigger parallelism-related deployment changes in some embodiments.

Heterogeneous Execution Platforms

Figure 7:
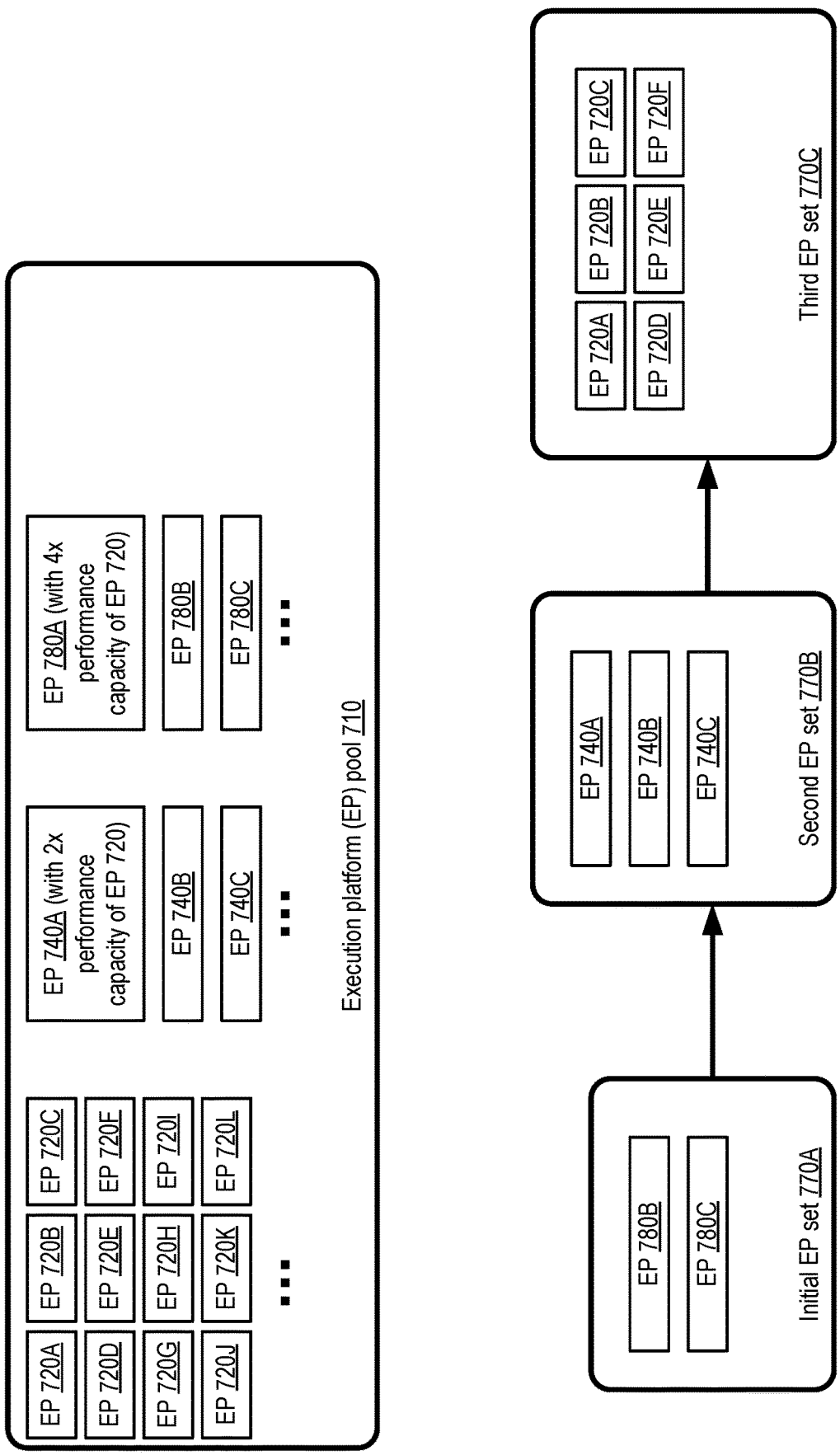
FIG. 7 illustrates an example scenario in which at least some of the execution platforms available for training a model may differ from each other in performance capacity, according to at least some embodiments.

As mentioned earlier, in some embodiments a variety of execution platforms may be usable for training machine learning model. FIG. 7 illustrates an example scenario in which at least some of the execution platforms available for training a model may differ from each other in performance capacity, according to at least some embodiments. As shown, EP pool 710 may include at least three classes of execution platforms. EP 720A-EP 720L may be able to support a baseline level of performance with respect to processing, memory size, network bandwidth, storage and/ or other factors. Each EP 740, such as 740A-740C may have double the performance capacity of an EP 720, and an EP 780 (e.g., 780A-780C) may have double the performance capacity of an EP 740. In some implementations a different processor architecture may be employed for different classes of execution platforms—e.g., a particular RISC (reduced instruction set computing) architecture may be used for one class, while a CISC (complex instruction set computing) architecture or a different RISC architecture may be used for another class. Some types of processor architectures may be better suited for certain types of computations performed during model training than other processor architectures, and the selection of execution platforms for different phases of training may thus be influenced by the processor architectures available. For example, specific instructions available in one architecture may be able to perform complex arithmetic faster than the instructions available in a different architecture, and some phases of model training may include more of such complex arithmetic operations than others.

When making deployment change decisions in such an environment, the training coordinator may therefore have to select the number of EPs of each class to be deployed, e.g., taking various factors into account such as the specific training technique being employed and the progress that has already been made with respect to parameter convergence. In the example shown in FIG. 7, the initial EP set 770A for a given model's training phase comprises two EPs with the highest performance capacities available: EP 780A and 780B. When a triggering condition such as those discussed earlier is met, a second EP set 770B comprising EP 740A, 740B and 740C may be deployed instead of EP set 770A, thus changing both the number and the category of EPs being used. Similarly, a second deployment change may result in the use of six EPs of the low-performance category: EPs 720A-720F. In some embodiments, not all the EPs assigned as a result of a deployment change decision need be identical as in the cases of EP sets 770A-770C: e.g., a combination of EPs belonging to two or more classes may be used instead. In some embodiments, EPs of the EP pool 710 may differ from each other not just in performance capabilities but in other characteristics as well—e.g., some EPs may use graphics processor units (GPUs) while others may use conventional CPUs, some EPs may be virtual machines while others may be implemented without virtualization, and so on. A switch between CPU-based and GPU-based EPs during a deployment change may be warranted in some cases, e.g., depending on the nature of the computations performed in the particular training techniques being used. The operating systems, software packages etc. used at one EP may differ from those of others in some embodiments. In general, the differences among the available EPs may increase the number of dimensions along which deployment change decisions may be made in various embodiments.

Execution Platforms as Participants in Deployment Decisions

As mentioned earlier, the role of the training coordinator or deployment change decision maker may be played by a variety of different entities, modules or devices in various embodiments. In some embodiments, the execution platforms being used during a given phase may themselves play an active role in making the decisions. FIG. 8a and FIG. 8b illustrate respective examples of the participation of one or more execution platforms in deployment change decisions, according to at least some embodiments.

In the embodiment depicted in FIG. 8a, a distributed decision protocol 850 may be used, with some or all of the EPs designated as members of an EP set for a particular portion of a model training phase participating in the protocol. As shown, each of EPs 820A-820C of EP set 850A may comprise a respective deployment change voting module (DCVM) 830, such as DCVMs 830A-830C. At various points during the training phase, each DCVM may cast a vote, e.g., as to (a) whether a deployment change is appropriate and/or (b) the nature of a proposed deployment change (e.g., the number and class of EPs that should be included in the next EP set to be used for the ongoing training phase). In some embodiments, a consensus-based decision protocol 850 may be used, in which all (or a majority) of the members of the current EP set 850A may have to approve a deployment change 890. If a deployment change is implemented, and any new EPs (such as EP 830D) are added to form the next EP set 770B, the newly-added EPs may also be granted voting rights with respect to further deployment change decisions in the depicted embodiment. In some embodiments, for example, potential deployment change proposals may be voted on when an EP has completed specified amounts of processing: e.g., when each EP has completed processing 25%, 50% or 75% of the training data assigned to it. In one embodiment, the EPs may vote at least at one or more epoch boundaries. The voting decisions of the respective EPs may be based, for example, on the EP's local metrics regarding bandwidth demands and/or other resource demands.

In the embodiment shown in FIG. 8b, one of the EPs (840A) of the EP set 811A may be designated as a "master" EP with respect to deployment change decisions, while other EPs such as 840B and 840C may be designated as "non-masters". In such a scenario, the master EP 840A may for example collect metrics pertaining to the progress being made at the non-master EPs, and use the collected metrics to make deployment change decisions such as decision 891, which results in the addition of EP 840D to form EP set 811B for the next stage of the training phase. In some embodiments, the master EP may also perform the same kinds of model update processing as the non-master EPs—e.g. the master node may be assigned its portion of the training data set, just as the non-master modes are assigned their portions. In other embodiments, the master EP may be treated differently with respect to model training duties—e.g., a smaller subset of the training data set may be assigned to the master EP than to other EPs to compensate for the work required for making deployment decisions. In one implementation the master node may be dedicated entirely to deployment decision making responsibilities, and may not be required to process any of the training data.

Machine Learning Service

Figure 9:
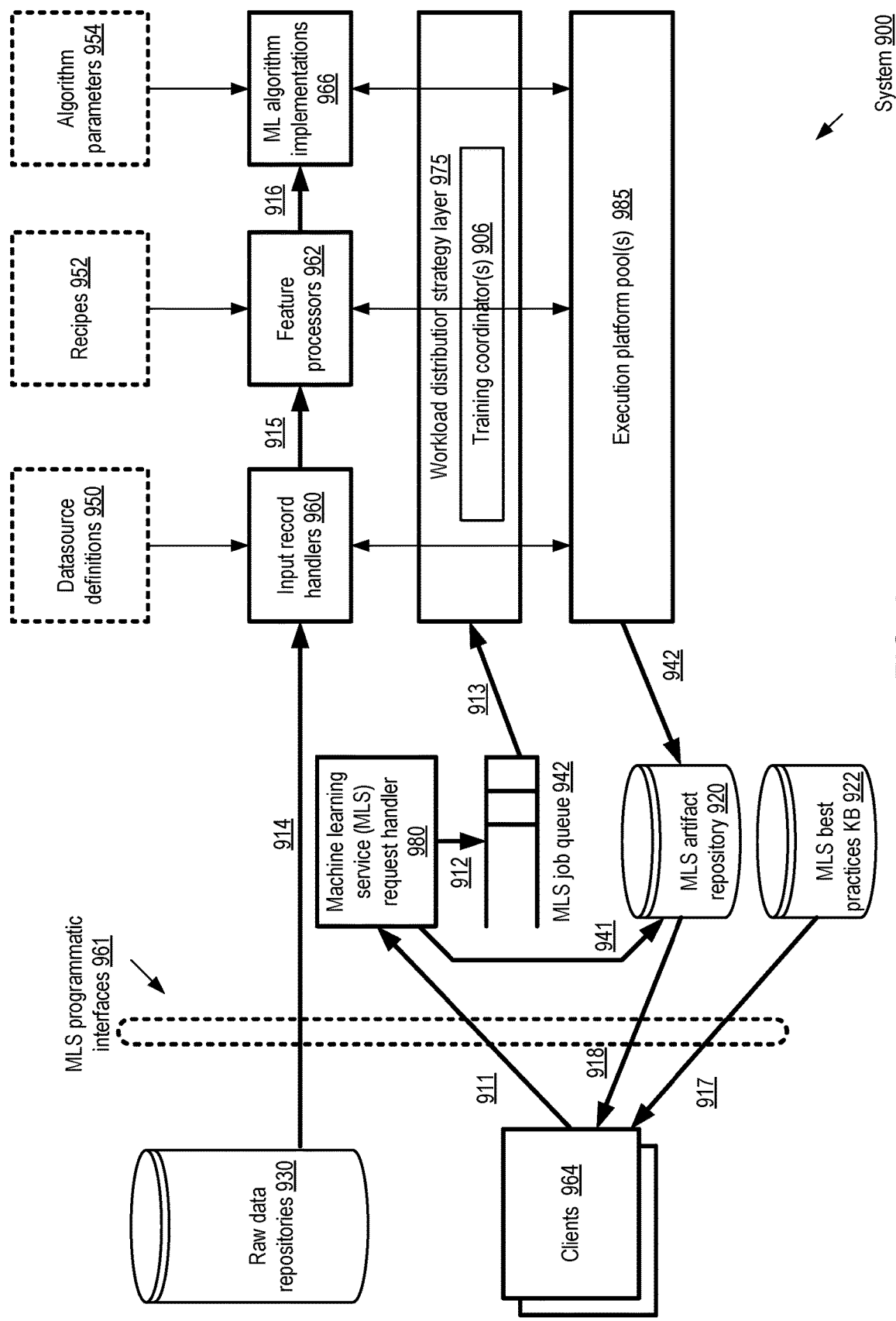
FIG. 9 provides an overview of a machine learning service at which the collection of execution platforms used for training a machine learning model may be dynamically scaled, according to at least some embodiments.

FIG. 9 provides an overview of a machine learning service at which the collection of execution platforms used for training a machine learning model may be dynamically scaled, according to at least some embodiments. In system 900 of FIG. 6, the machine learning service (MLS) may include a plurality of computation engines organized into one or more execution platform pools 985. At least some of the computation engines may be used to implement parallelized training of various kinds of machine learning models, e.g., using stochastic gradient descent and/or other algorithms. The training data sets (or pointers to sources of the training data sets) for various models may be received at the MLS via programmatic interfaces 961 from various MLS clients 964 in the depicted embodiment. Any of a variety of programmatic interfaces may be used in different embodiments, such as APIs, command-line tools, web pages, or standalone GUIs. In general, the programmatic interfaces 961 may also be used by the clients to submit requests 911 for a variety of machine learning-related tasks or operations. The administrative or control plane portion of the MLS may include MLS request handler 980, which accepts the client requests 911 and inserts corresponding job objects into MLS job queue 942, as indicated by arrow 912. In general, the control plane of the MLS may comprise a plurality of components (including the request handler, workload distribution strategy selectors, one or more job schedulers, metrics collectors, and/or modules that act as interfaces with other services). The data plane of the MLS may include, for example, at least a subset of the servers of pool(s) 985, storage devices that are used to store input data sets including training, test or evaluation data, intermediate results or final results, and the network pathways used for transferring client input data and results.

Client-submitted requests to train models using specified training data sets may each be translated into one or more units of work called "jobs" in the depicted embodiment, with corresponding job objects being generated and stored in the job queue 942. In some embodiments, training requests submitted via interfaces 961 may include client-specified parameters indicating whether dynamic scaling of the execution platform sets to be used for the training is to be attempted, or whether the client prefers a static set of execution platforms for the entire training phase. Thus, a client may programmatically pre-approve deployment changes which may be made at the MLS during the training phase in some embodiments, without necessarily being aware of what those changes might involve. In one embodiment, a model training request may indicate one or more constraints or preferences which may be taken into account when the MLS decides whether dynamic deployment changes of the kind discussed above are to be made, and/or the kinds of deployment changes to make. For example, a client may indicate a budget limit, a resource limit, and/or a time limit, and the MLS may use such constraints to decide the initial deployment set for the training job, as well as whether and when deployment changes are to be made. The triggering conditions for deployment changes may be indicated by clients in some embodiments, and/or desired or targeted properties of the execution platform sets to be used during different stages of training may be indicated by the clients. For example, a client may indicate that the training phase for a particular model is to start with up to N execution platforms of a particular category, and that no more than 4N such platforms are to be used during the training phase.

Jobs may be removed from job queue 942 by a component of a workload distribution strategy layer 975, as indicated by arrow 913, and a processing plan may be identified for each such job. The workload distribution strategy layer 975 may determine the manner in which the lower level operations of the job are to be distributed among one or more computation engines selected from pool 985, and/or the manner in which the data analyzed or manipulated for the job is to be distributed among one or more storage devices or servers. In the depicted embodiment, the workload distribution strategy layer 975 may include one or more training coordinators 906 responsible for making the kinds of deployment change decisions discussed earlier. After the processing plan has been generated and the appropriate set of resources to be utilized for the job has been identified, the job's operations may be scheduled on the resources. Results of some jobs (e.g., trained models) may be stored as MLS artifacts within repository 920 in some embodiments, as indicated by arrow 943.

A client request 911 may indicate various parameters that may be used by the MLS to perform the operations, such as a data source definition (which may indicate a source for a training data set), a feature processing transformation recipe, or parameters to be used for a particular machine learning algorithm. Some machine learning workflows, which may correspond to a sequence of API requests from a client 964, may include the extraction and cleansing of input data records from raw data repositories 930 (e.g., repositories indicated in data source definitions 950) by input record handlers 960 of the MLS, as indicated by arrow 914. In at least some embodiments, the input data reaching the MLS may be encrypted or compressed, and the MLS input data handling machinery may have to perform decryption or decompression before the input data records can be used for training or other machine learning tasks. For some types of machine learning requests, the output produced by the input record handlers may be fed to feature processors 962 (as indicated by arrow 915), where a set of transformation operations may be performed in accordance with various transformation recipes, e.g., using another set of resources from pool 985. The output 916 of the feature processing transformations may in turn be used as input for a selected machine learning algorithm 966, which may be executed using yet another set of resources from pool 985. A wide variety of machine learning algorithms may be supported natively by the MLS, including for example regression algorithms, classification algorithms (such as random forest algorithms), neural network algorithms, and the like. In at least one embodiment, the MLS may be designed to be extensible—e.g., clients may provide or register their own modules (which may be specified as user-defined functions) for input record handling, feature processing, or for implementing additional machine learning algorithms than are supported natively by the MLS.

In the embodiment depicted in FIG. 6, the MLS may maintain knowledge base 922 containing information on best practices for various tasks, including for example the kinds of dynamic scaling techniques described above. Such knowledge base entries may be used, for example, to select parallelizable training techniques, to determine the initial set of EPs to be used to train a given model, to determine what kinds of deployment changes may prove effective for a given training technique, and so on. Entries may be added into the best practices KB 922 by various control-plane components of the MLS, e.g., based on results of earlier operations, client feedback, and so on. In at least some embodiments, clients 964 may access at least some of the contents of the KB 922 and/or the ML repository 920 using programmatic interfaces 961, as indicated by arrows 917 and 918. It is noted that the dynamic scaling techniques described herein may be employed in at least some embodiments without using MLS resources—that is, the existence or availability of a machine learning service is not a requirement for implementing training-phase deployment changes.

Methods for Supporting Dynamically Scalable Training Fleets

Figure 10:
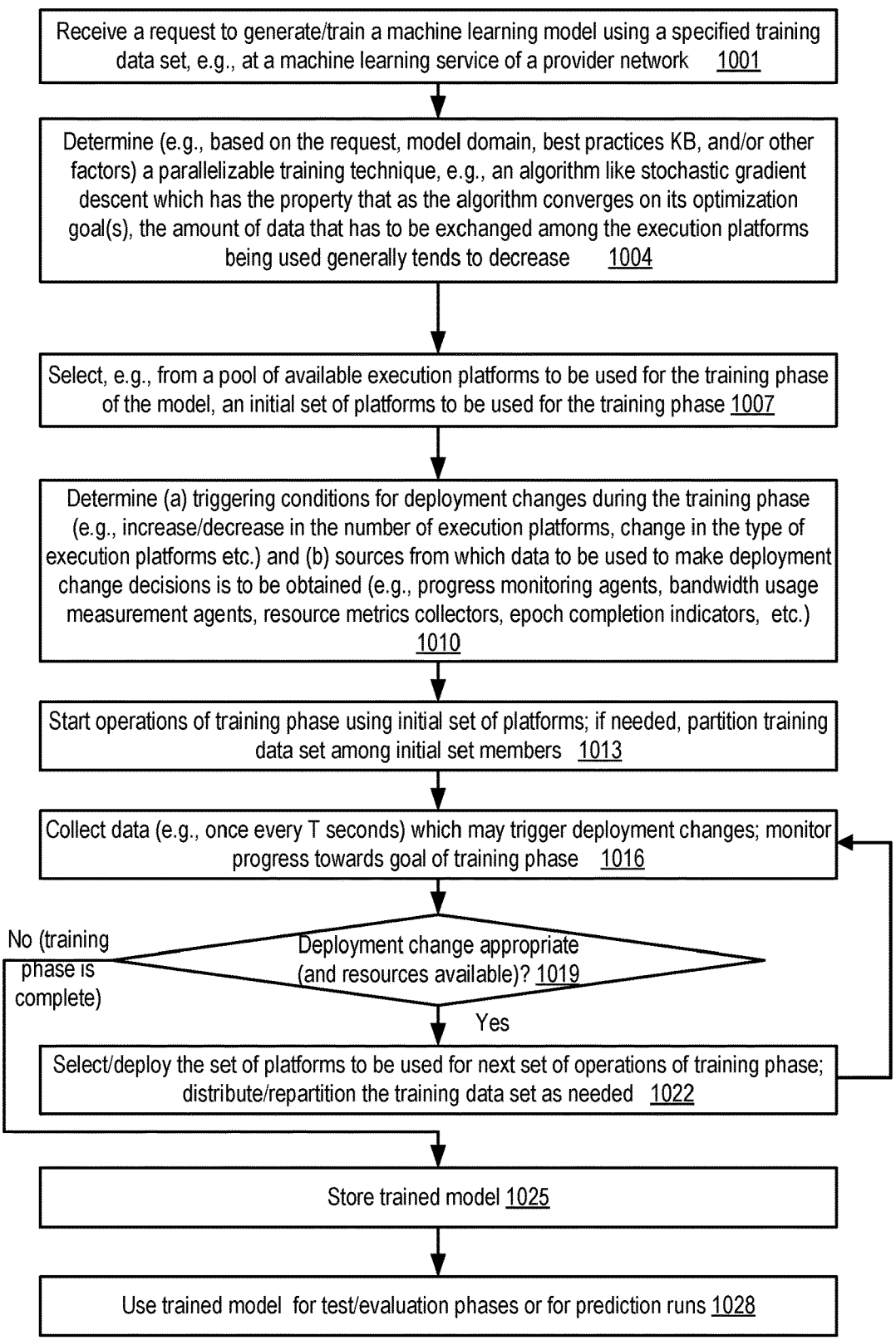
FIG. 10 is a flow diagram illustrating aspects of operations that may be performed to support dynamic scaling of execution platform sets for training machine learning models, according to at least some embodiments.

FIG. 10 is a flow diagram illustrating aspects of operations that may be performed to support dynamic scaling of execution platform sets for training machine learning models, according to at least some embodiments. As shown in element 1001, a request to generate or train a model may be received via a programmatic interface, e.g., at a component of a machine learning service similar to that described above. The request may indicate a training data set or one or more data sources from which observation records to be used to train the model are to be obtained. Training requests or requirements with respect to a wide variety of model families and problem domains may be received—e.g., regression models, classification models, time series models, neural network models, natural language processing models, and the like.

As shown in element 1004, a parallelizable or parallel training technique may be selected for the model based on various factors. In some cases the request may indicate the particular technique to be used, for example. In some embodiments the technique may be selected from a library of available techniques, e.g., based on the kind of model to be generated, one or more knowledge base entries, the size of the training data set, and/or the number of execution platforms that are currently available for use. In some embodiments, a selected training technique may have the property that the amount of synchronization data (e.g., gradient data used to coordinate model parameter updates) that has to be transferred among the participating parallel platforms generally tends to decrease as an optimization goal of the technique is approached—e.g., as the optimization converges on a solution such as a minimization of an error function, fewer adjustments typically have to be made to the model parameters. Examples of such techniques may include variants of stochastic gradient descent, and/or variants of the Broyden-Fletcher-Goldfarb-Shanno (BFGS) algorithm in some embodiments.

An initial set of execution platforms may be selected from a pool of platforms to start the training phase (element 1007). The number and type of platforms chosen for the initial state may be selected based on factors such as the particular technique being used, the amount of training data to be examined, a preference indicated by the client on whose behalf the model is to be trained, and the like.

One or more triggering conditions for deployment changes (e.g., changes to the number and/or type of platforms to be used for at least some of the remaining operations of the training phase at the time the change decision is made) may be identified (element 1010), along with the particular changes to be made if and when the conditions are met (e.g., whether the number of platforms is to be decreased or increased, whether different classes of platforms are to be deployed after the change, and so on). Sources of the data that are to be used to make the deployment change decisions may also be identified, such as training progress or epoch completion monitors, resource utilization monitors, network monitors and the like. In some embodiments, respective triggering conditions for different deployment changes may be identified, and some of the conditions may have other conditions as prerequisites. For example, a first condition C1 which is to lead to a deployment change DC1 may be identified, and a second condition which is to lead to a different deployment change DC2 only if DC1 has already been implemented may be identified. In some embodiments, only the triggering conditions may be identified, and the specific changes to be made to the execution platform set of the conditions are met may be determined after the conditions are met.

The training phase may be started using the initial set of execution platforms (element 1013). The training data set may be partitioned among the platforms in some embodiments for at least some training techniques. For other training techniques, the training data set may not have to be partitioned—e.g., each participant platform may examine the same set of observation records. In some implementations, the entire training data set may be stored in a plurality of files and may be accessible from each of the execution platforms. In such cases, the training data set may be partitioned by indicating to each execution platform the particular files it is to examine (or the particular offset ranges within the particular files for the observation records to be analyzed by the individual platforms).

Various types of metrics that may influence deployment changes may be collected (e.g., once every T seconds), and the progress of the training towards one or more training goals may be tracked (element 1016). If the collected data indicates that one or more of the triggering conditions has been met (as detected in element 1019), and sufficient resources are available to make a corresponding deployment change, a different set of execution platforms may be selected from the pool of platforms (element 1022) and the training data set may be repartitioned for the next stage of training if necessary. The process of collecting data may be resumed (element 1016), and more deployment changes may be implemented as needed. If one or more of the training goals have been met (e.g., if the parameter values have met the optimization criterion being targeted, the time allocated for training has expired, or a target number of epochs or passes through the training data set has been completed) (as also detected in element 1019), the training phase may be terminated. The trained model may be stored (e.g., in a repository of MLS artifacts similar to that shown in FIG. 9) (element 1025). In some embodiments the model may be tested and evaluated, and eventually used for making predictions on previously unanalyzed data (element 1028).

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations—e.g., the number of execution platforms to be selected for the initial portion of training may be fixed (e.g., at one or two) beforehand, so a decision is to the number of platforms to start training may not have to be made.

Use Cases

The techniques described above, of using dynamically scaling the set of execution platforms used to train a given machine learning model, may be useful in a variety of environments. Many problem domains being addressed using machine learning, including, for example, statistical machine translation, other natural language processing tasks, so-called deep learning applications and the like may require analysis of terabytes or even petabytes of data. In some cases, multiple passes through the training data may be required to achieve results with desired levels of accuracy, further extending the training time and cost. The algorithms used to train models for such domains may in some cases be parallelizable: e.g., the training data sets may be partitioned and individual partitions may be analyzed on separate execution platforms. However, the speedup made possible in principle by parallelization may not necessarily be achieved if the amount of parameter synchronization data that is transferred among the parallel trainers results in a networking bottleneck. Furthermore, the amount of data that has to be transferred may vary dramatically during the course of training a given model: for example, much more data may have to be transferred in the early stages of training than in the later stages when the parameters are closer to their optimum or final values. By keeping track of the varying requirements (e.g., bandwidth required for synchronization) and constraints (e.g., the number of available execution platforms) of the training process as it proceeds, and adjusting the deployed resources accordingly, training times and costs may be minimized for various machine learning problems.

Illustrative Computer System

Figure 11:
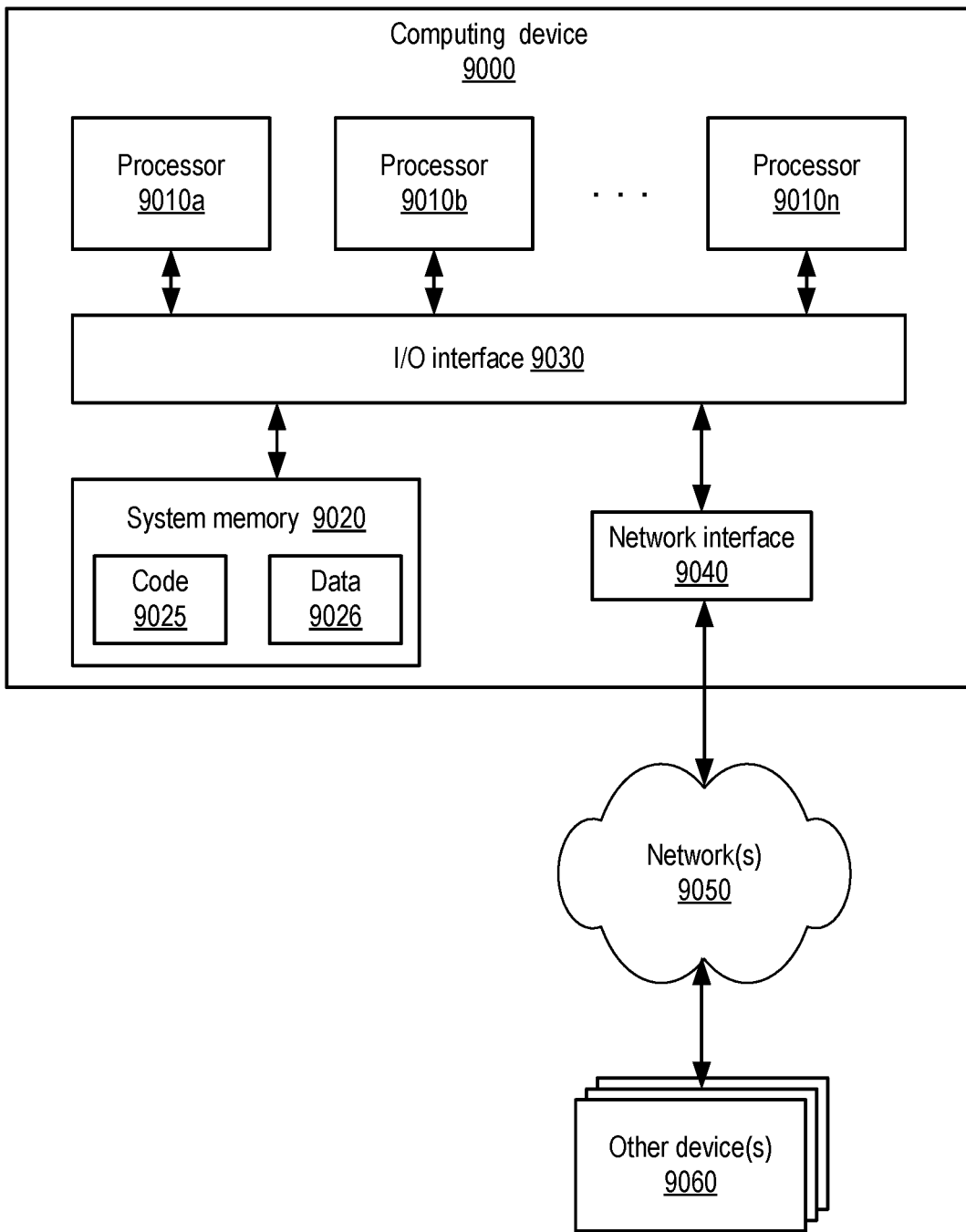
FIG. 11 is a block diagram illustrating an example computing device that may be used in at least some embodiments.

In at least some embodiments, a server that implements one or more of the techniques described above for dynamically scaling the collection of execution platforms used for training a machine learning model (including for example training coordinators, the training execution platforms themselves, and/or various components of a machine learning service) may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, at one or more computing devices:
providing access to a respective partition of a training data set of a machine learning model to a plurality of computing resources, including a first computing resource and a second computing resource, wherein the first computing resource is assigned to perform operations of a training technique on a first partition of the training data set, and wherein the second computing resource is assigned to perform operations of the training technique on a second partition of the training data set;
executing a training phase of the machine learning model on the first computing resource and the second computing resource according to the training technique;
detecting, during the training phase of the machine learning model, that a measure of progress of operations of the training technique through the first partition at the first computing resource exceeds a measure of progress of operations of the training technique through the second partition at the second computing resource;
configuring, during the training phase, based at least in part on said detecting, one or more additional computing resources to perform at least a subset of remaining operations of the training technique on the second partition; and
executing the at least subset of remaining operations of the training technique on the second partition on the one or more additional computing resources.

2. The method as recited in claim 1, further comprising performing, at the one or more computing devices:
verifying, prior to modifying the number or type of computing resources assigned to a particular partition of the training data set to perform operations of the training technique, that a time interval since a previous modification of the number or type of computing resources assigned to the particular partition exceeds a threshold.

3. The method as recited in claim 1, further comprising performing, at the one or more computing devices:
casting, by a deployment change voting module of the first computing resource, a vote as part of a distributed decision protocol to determine whether the one or more additional computing resources are to be configured.

4. The method as recited in claim 1, further comprising performing, at the one or more computing devices:
designating the first computing resource as a master node with respect to computing resource deployment change decisions;
obtaining, at the first computing resource, respective sets of metrics from one or more other computing resources of the plurality of computing resources during the implementation of the training technique, including the second computing resource; and
initiating, by the first computing resource, based at least in part on analysis of the respective sets of metrics, at least one computing resource deployment change for a particular partition of the plurality of partitions, wherein the computing resource deployment change comprises a change in the number or type of computing resources assigned to perform operations of the training technique on the particular partition.

5. The method as recited in claim 1, further comprising performing, at the one or more computing devices:
determining that an amount of synchronization data transferred among a set of computing resources assigned to implement the training technique has reached a threshold; and
initiating, based at least in part on said determining, at least one computing resource deployment change for a particular partition of the training data set, wherein the computing resource deployment change comprises a change in the number or type of computing resources assigned to perform operations of the training technique on the particular partition.

6. The method as recited in claim 1, further comprising performing, at the one or more computing devices:
reducing, based at least in part on analysis of one or more metrics, a number of computing resources assigned to perform operations of the training technique on a particular partition of the training data set.

7. The method as recited in claim 1, wherein the machine learning model comprises one or more of: (a) a neural network model, (b) a natural language processing model, (c) a logistic regression model, (d) a decision tree model, (e) an ensemble model, (f) a Gaussian process model, (g) a time series model, (h) a regression model other than a logistic regression model or (i) a classification model.

8. A system, comprising:
one or more computing devices;
wherein the one or more computing devices include instructions that upon execution on or across one or more processors cause the one or more computing devices to:
provide access to a respective partition of a training data set of a machine learning model to a plurality of computing resources, including a first computing resource and a second computing resource, wherein the first computing resource is assigned to perform operations of a training technique on a first partition of the training data set, and wherein the second computing resource is assigned to perform operations of the training technique on a second partition of the training data set;
execute a training phase of the machine learning model on the first computing resource and the second computing resource according to the training technique;
detect, during the training phase of the machine learning model, that a measure of progress of operations of the training technique through the first partition at the first computing resource exceeds a measure of progress of operations of the training technique through the second partition at the second computing resource;
configure, during the training phase, based at least in part on the detection, one or more additional computing resources to perform at least a subset of remaining operations of the training technique on the second partition; and
execute the at least subset of remaining operations of the training technique on the second partition on the one or more additional computing resources.

9. The system as recited in claim 8, wherein the one or more computing devices include further instructions that upon execution on or across one or more processors further cause the one or more computing devices to:
verify, prior to modifying the number or type of computing resources assigned to a particular partition of the training data set to perform operations of the training technique, that a time interval since a previous modification of the number or type of computing resources assigned to the particular partition exceeds a threshold.

10. The system as recited in claim 8, wherein the one or more computing devices include further instructions that upon execution on or across one or more processors further cause the one or more computing devices to:
cause a deployment change voting module of the first computing resource to cast a vote as part of a distributed decision protocol to determine whether the one or more additional computing resources are to be configured.

11. The system as recited in claim 8, wherein the one or more computing devices include further instructions that upon execution on or across one or more processors further cause the one or more computing devices to:
designate the first computing resource as a master node with respect to computing resource deployment change decisions;
cause to be obtained, at the first computing resource, respective sets of metrics from one or more other computing resources of the plurality of computing resources during the implementation of the training technique, including the second computing resource; and
cause to initiate, by the first computing resource, based at least in part on analysis of the respective sets of metrics, at least one computing resource deployment change for a particular partition of the plurality of partitions, wherein the computing resource deployment change comprises a change in the number or type of computing resources assigned to perform operations of the training technique on the particular partition.

12. The system as recited in claim 8, wherein the one or more computing devices include further instructions that upon execution on or across one or more processors further cause the one or more computing devices to:
  determine that an amount of synchronization data transferred among a set of computing resources assigned to implement the training technique has reached a threshold; and
  initiate, based at least in part on the determination, at least one computing resource deployment change for a particular partition of the training data set, wherein the computing resource deployment change comprises a change in the number or type of computing resources assigned to perform operations of the training technique on the particular partition.

13. The system as recited in claim 8, wherein the one or more computing devices include further instructions that upon execution on or across one or more processors further cause the one or more computing devices to:
  reduce, based at least in part on analysis of one or more metrics, a number of computing resources assigned to perform operations of the training technique on a particular partition of the training data set.

14. The system as recited in claim 8, wherein the training technique comprises one or more of: (a) a stochastic gradient descent technique, (b) a Broyden-Fletcher-Goldfarb-Shanno (BFGS) technique, or (c) a limited memory BFGS (LMBFGS) technique.

15. One or more non-transitory computer-accessible storage media storing program instructions that when executed on or across one or more processors cause one or more computer systems to:
  provide access to a respective partition of a training data set of a machine learning model to a plurality of computing resources, including a first computing resource and a second computing resource, wherein the first computing resource is assigned to perform operations of a training technique on a first partition of the training data set, and wherein the second computing resource is assigned to perform operations of the training technique on a second partition of the training data set;
  cause the first computing resource and the second computing resource to execute a training phase of the machine learning model according to the training technique;
  detect, during the training phase of the machine learning model, that a measure of progress of operations of the training technique through the first partition at the first computing resource exceeds a measure of progress of operations of the training technique through the second partition at the second computing resource;
  cause to be configured, during the training phase, based at least in part on the detection, one or more additional computing resources to perform at least a subset of remaining operations of the training technique on the second partition; and
  cause the one or more additional computing resources to execute the at least subset of remaining operations of the training technique.

16. The one or more non-transitory computer-accessible storage media as recited in claim 15, storing further program instructions that when executed on or across the one or more processors further cause the one or more computer systems to:
  verify, prior to modifying the number or type of computing resources assigned to a particular partition of the training data set to perform operations of the training technique, that a time interval since a previous modification of the number or type of computing resources assigned to the particular partition exceeds a threshold.

17. The one or more non-transitory computer-accessible storage media as recited in claim 15, storing further program instructions that when executed on or across the one or more processors further cause the one or more computer systems to:
  cause a deployment change voting module of the first computing resource to cast a vote as part of a distributed decision protocol to determine whether the one or more additional computing resources are to be configured.

18. The one or more non-transitory computer-accessible storage media as recited in claim 15, storing further program instructions that when executed on or across the one or more processors further cause the one or more computer systems to:
  designate the first computing resource as a master node with respect to computing resource deployment change decisions;
  cause to be obtained, at the first computing resource, respective sets of metrics from one or more other computing resources of the plurality of computing resources during the implementation of the training technique, including the second computing resource; and
  cause to initiate, by the first computing resource, based at least in part on analysis of the respective sets of metrics, at least one computing resource deployment change for a particular partition of the plurality of partitions, wherein the computing resource deployment change comprises a change in the number or type of computing resources assigned to perform operations of the training technique on the particular partition.

19. The one or more non-transitory computer-accessible storage media as recited in claim 15, storing further program instructions that when executed on or across the one or more processors further cause the one or more computer systems to:
  determine that an amount of synchronization data transferred among a set of computing resources assigned to implement the training technique has reached a threshold; and
  initiate, based at least in part on the determination, at least one computing resource deployment change for a particular partition of the training data set, wherein the computing resource deployment change comprises a change in the number or type of computing resources assigned to perform operations of the training technique on the particular partition.

20. The one or more non-transitory computer-accessible storage media as recited in claim 15, storing further program instructions that when executed on or across the one or more processors further cause the one or more computer systems to:
  reduce, based at least in part on analysis of one or more metrics, a number of computing resources assigned to perform operations of the training technique on a particular partition of the training data set.

* * * * *